United States Patent
Levi et al.

(10) Patent No.: US 11,711,158 B2
(45) Date of Patent: Jul. 25, 2023

(54) ACCURATE TIME-STAMPING OF OUTBOUND PACKETS

(71) Applicant: MELLANOX TECHNOLOGIES, LTD., Yokneam (IL)

(72) Inventors: Dotan David Levi, Kiryat Motzkin (IL); Wojciech Wasko, Młynek (PL); Natan Manevich, Ramat HaSharon (IL); Hillel Chapman, Ramat Hashofet (IL); Roi Geuli, Moshav ein Haemek (IL); Eyal Serbro, Kefar Yehoshua (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 42 days.

(21) Appl. No.: 17/359,667

(22) Filed: Jun. 28, 2021

(65) Prior Publication Data

US 2022/0416925 A1 Dec. 29, 2022

(51) Int. Cl.
  *H04J 3/06* (2006.01)
(52) U.S. Cl.
  CPC ............ *H04J 3/0661* (2013.01); *H04J 3/062* (2013.01)
(58) Field of Classification Search
  USPC ....................................................... 370/509
  See application file for complete search history.

(56) References Cited

U.S. PATENT DOCUMENTS

| | | | |
|---|---|---|---|
| 6,212,197 B1 | 4/2001 | Christensen et al. | |
| 6,564,267 B1 | 5/2003 | Lindsay | |
| 6,816,492 B1 | 11/2004 | Turner et al. | |
| 6,954,432 B1 | 10/2005 | Bychowsky et al. | |
| 7,224,669 B2 | 5/2007 | Kagan et al. | |
| 7,245,627 B2 | 7/2007 | Goldenberg et al. | |
| 7,676,597 B2 | 3/2010 | Kagan et al. | |
| 8,370,675 B2 | 2/2013 | Kagan | |

(Continued)

FOREIGN PATENT DOCUMENTS

| | | |
|---|---|---|
| AU | 2012216611 B2 | 3/2013 |
| CN | 103354989 A | 10/2013 |

(Continued)

OTHER PUBLICATIONS

IEEE Standard 1588-2008, "IEEE Standard for a Precision Clock Synchronization Protocol for Networked Measurement and Control Systems", pp. 1-289, year 2008.

(Continued)

*Primary Examiner* — Gregory B Sefcheck
*Assistant Examiner* — Majid Esmaeilian
(74) *Attorney, Agent, or Firm* — Kligler & Associates Patent Attorneys Ltd (57) ABSTRACT

A network device includes a port, a transmission pipeline and a time-stamping circuit. The port is configured for connecting to a network. The transmission pipeline includes multiple pipeline stages and is configured to process packets and to send the packets to the network via the port. The time-stamping circuit is configured to temporarily suspend at least some processing of at least a given packet in the transmission pipeline, to verify whether a pipeline stage having a variable processing delay, located downstream from the time-stamping circuit, meets an emptiness condition, and, only when the pipeline stage meets the emptiness condition, to time-stamp the given packet and resume the processing of the given packet.

30 Claims, 2 Drawing Sheets

(56) References Cited

U.S. PATENT DOCUMENTS

| | | | |
|---|---|---|---|
| 9,390,056 | B1 | 7/2016 | Noureddine et al. |
| 9,397,960 | B2 | 7/2016 | Arad et al. |
| 9,450,846 | B1 | 9/2016 | Huang et al. |
| 9,667,446 | B2 | 5/2017 | Worrell |
| 10,027,601 | B2 | 7/2018 | Narkis et al. |
| 10,187,400 | B1 | 1/2019 | Castro et al. |
| 10,284,383 | B2 | 5/2019 | Bloch et al. |
| 10,320,508 | B2 | 6/2019 | Shimizu et al. |
| 10,727,966 | B1 | 7/2020 | Izenberg et al. |
| 2003/0002483 | A1 | 1/2003 | Zwack |
| 2004/0174820 | A1 | 9/2004 | Ricciulli |
| 2006/0007862 | A1* | 1/2006 | Sayeedi .................. H04L 47/32 370/282 |
| 2006/0153179 | A1 | 7/2006 | Ho et al. |
| 2008/0298380 | A1 | 12/2008 | Rittmeyer et al. |
| 2012/0201248 | A1 | 8/2012 | Aoki |
| 2013/0027611 | A1* | 1/2013 | Closset .................. H03L 7/087 348/E5.009 |
| 2013/0173950 | A1* | 7/2013 | Banerjea ............... H04J 3/0664 713/503 |
| 2014/0092918 | A1* | 4/2014 | Jost ....................... H04J 3/0661 370/465 |
| 2014/0379714 | A1 | 12/2014 | Hankins |
| 2015/0046741 | A1 | 2/2015 | Yen et al. |
| 2015/0055508 | A1 | 2/2015 | Ashida et al. |
| 2015/0318015 | A1 | 11/2015 | Bose et al. |
| 2017/0125026 | A1* | 5/2017 | Lawrence .......... H04N 21/6336 |
| 2017/0171362 | A1 | 6/2017 | Bolotov et al. |
| 2017/0188092 | A1* | 6/2017 | Lawrence ........ H04N 21/43615 |
| 2017/0331926 | A1 | 11/2017 | Raveh et al. |
| 2018/0124812 | A1 | 5/2018 | Thubert et al. |
| 2018/0191629 | A1 | 7/2018 | Biederman et al. |
| 2018/0309821 | A1* | 10/2018 | Byers ....................... H04L 67/12 |
| 2019/0056972 | A1 | 2/2019 | Zhou et al. |
| 2019/0087352 | A1 | 3/2019 | Lee et al. |
| 2019/0087652 | A1 | 3/2019 | Townsend et al. |
| 2019/0124524 | A1 | 4/2019 | Gormley |
| 2019/0149365 | A1 | 5/2019 | Chatterjee et al. |
| 2019/0319730 | A1 | 10/2019 | Webb et al. |
| 2019/0379714 | A1 | 12/2019 | Levi et al. |
| 2020/0026656 | A1 | 1/2020 | Liao et al. |
| 2020/0252320 | A1 | 8/2020 | Zemach et al. |
| 2020/0259759 | A1 | 8/2020 | Shalev et al. |
| 2021/0081352 | A1 | 3/2021 | Yang et al. |

FOREIGN PATENT DOCUMENTS

| | | |
|---|---|---|
| EP | 0607412 B1 | 1/1999 |
| JP | 2005529523 A | 9/2005 |
| JP | 2007042145 A | 2/2007 |
| WO | 9418627 A2 | 8/1994 |
| WO | 9857497 A1 | 12/1998 |
| WO | 2001037489 A1 | 5/2001 |
| WO | 2010117359 A1 | 10/2010 |

OTHER PUBLICATIONS

Weibel et al., "Implementation and Performance of Time Stamping Techniques", 2004 Conference on IEEE 1588, pp. 1-29, Sep. 28, 2004.

InfiniBandTM Architecture Specification vol. 1, Release 1.2.1,pp. 1-1727, Nov. 2007.

Lu et al., "A Fast CRC Update Implementation", Computer Engineering Laboratory, Electrical Engineering Department, pp. 113-120, Oct. 8, 2003.

Mellette et al., "Toward Optical Switching in the Data Center", IEEE 19th International Conference on High Performance Switching and Routing (HPSR), pp. 1-6, Bucharest, Romania, Jun. 18-20, 2018.

Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.

O-RAN Alliance, "O-RAN Fronthaul Working Group; Control, User and Synchronization Plane Specification", ORAN-WG4.CUS. 0-v01.00, Technical Specification, pp. 1-189, year 2019.

Vattikonda et al., "Practical TDMA for Datacenter Ethernet", EuroSys conference, Bern, Switzerland, pp. 225-238, Apr. 10-13, 2012.

Ericsson AB et al., "Common Public Radio Interface: eCPRI Interface Specification", V2.0, pp. 1-109, May 10, 2019.

Xilinx Inc., "Radio over Ethernet Framer v2.1", PB056 (v2.1), pp. 1-9, Oct. 30, 2019.

Weibel, H., "High Precision Clock Synchronization according to IEEE 1588 Implementation and Performance Issues", Zurich University of Applied Sciences, pp. 1-9, Jan. 17, 2005.

Sanchez-Palencia, J., "[RFC,v3,net-next,00/18] Time based packet transmission", pp. 1-14, Mar. 7, 2018.

IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.

Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.

Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.

Wikipedia,Precision Time Protocol, pp. 1-9, Apr. 20, 2020.

SMPTE Standard, "Professional Media Over Managed IP Networks:Traffic Shaping and Delivery Timing for Video", The Society of Motion Picture and Television Engineers, pp. 1-17, Nov. 22, 2017.

Wikipedia, "Time-Sensitive Networking", pp. 1-12, Mar. 5, 2020.

Levi et al., U.S. Appl. No. 16/782,075, filed Feb. 5, 2020.

Levi et al., U.S. Appl. No. 16/921,993, filed Jul. 7, 2020.

Mula et al., U.S. Appl. No. 16/910,193, filed Jun. 24, 2020.

Levi et al., U.S. Appl. No. 17/067,690, filed Oct. 11, 2020.

Mills, "Network Time Protocol (Version 1): Specification and Implementation," RFC 1059, pp. 2-59, Jul. 1988.

Mills, "Internet Time Synchronization: The Network Time Protocol," IEEE Transactions on Communication, vol. 39, No. 10, pp. 1482-1493, Oct. 1991.

Mills, "Network Time Protocol (Version 3): Specification, Implementation and Analysis," RFC 1305, pp. 1-96, Mar. 1992.

Mills, "Network Time Protocol (NTP)," RFC 0958, pp. 2-15, Sep. 1985.

U.S. Appl. No. 16/910,193 Office Action dated Jul. 7, 2021.

Levi et al., U.S. Appl. No. 17/315,396, filed May 10, 2021.

IEEE Standard 1588-2002, "IEEE Standard for a Precision Clock Synchronization Protocol for Networked Measurement and Control Systems", pp. 1-154, year 2002.

U.S. Appl. No. 16/910,193 Office Action dated Dec. 17, 2021.

U.S. Appl. No. 16/921,993 Office Action dated Dec. 22, 2021.

EP Application # 21181591.5 Search Report dated Sep. 17, 2021.

Baboescu et al., "Scalable Packet Classification," Proceedings of SIGCOMM'01, ACM, pp. 199-210, year 2001.

Bader et al., "Survey and Comparison of Open Source Time Series Databases," BTW 2017, Workshopband, Lecture Notes in Informatics (LNI), Gesellschaft fuer Informatik, Bonn, pp. 249-268, year 2017.

Davie et al., "An Expedited Forwarding PHB (Per-Hop-Behavior)", RFC 3246, Network Working Group, pp. 1-32, Mar. 2002.

Yau et al., "Development of Situation-Aware Application Software for Ubiquitous Computing Environments," Proceedings of the 26th Annual International Computer Software and Applications Conference (COMSAC'02), IEEE Computer Society, pp. 1-6, year 2002.

\* cited by examiner

ACCURATE TIME-STAMPING OF OUTBOUND PACKETS

STATEMENT REGARDING SPONSORED RESEARCH OR DEVELOPMENT

The project leading to this application has received funding from the European Union's Horizon 2020 research and innovation program under grant agreement No 957403.

FIELD OF THE INVENTION

The present invention relates generally to packet communication, and particularly to methods and systems for accurate time-stamping of outbound packet in network devices.

BACKGROUND OF THE INVENTION

In various applications, network devices time-stamp packets that they receive, transmit or forward. Time-stamping is used, for example, in time-synchronization protocols that synchronize network nodes to a common time-base. One common example of such a protocol is the Precision Time Protocol (PTP) defined in IEEE standards 1588-2002 and 1588-2008, and later versions thereof.

SUMMARY OF THE INVENTION

An embodiment of the present invention that is described herein provides a network device including a port, a transmission pipeline and a time-stamping circuit. The port is configured for connecting to a network. The transmission pipeline includes multiple pipeline stages and is configured to process packets and to send the packets to the network via the port. The time-stamping circuit is configured to temporarily suspend at least some processing of at least a given packet in the transmission pipeline, to verify whether a pipeline stage having a variable processing delay, located downstream from the time-stamping circuit, meets an emptiness condition, and, only when the pipeline stage meets the emptiness condition, to time-stamp the given packet and resume the processing of the given packet.

In some embodiments, the pipeline stage having the variable processing delay is a buffer having a variable occupancy level.

In some embodiments, the time-stamping circuit is configured to support (i) a normal mode in which packets are time-stamped regardless of whether the pipeline stage meets the emptiness condition, and (ii) a high-accuracy mode in which packets are time-stamped only when the pipeline stage meets the emptiness condition. In an example embodiment, the time-stamping circuit is configured to apply the high-accuracy mode only to selected packets. In another embodiment, the time-stamping circuit is configured to apply the high-accuracy mode only to time-synchronization packets. In yet another embodiment, the time-stamping circuit is configured to apply the high-accuracy mode only while the port is not subject to backpressure from the network.

In an embodiment, the time-stamping circuit is configured to adaptively modify a strictness of the emptiness condition. In a disclosed embodiment, the time-stamping circuit is configured to adjust a time-stamping accuracy of the time-stamping circuit until reaching a target accuracy, by adaptively modifying the emptiness condition. In an example embodiment, the time-stamping circuit is configured to apply a first emptiness condition, having a first strictness, when the given packet is associated with a first application, and to apply a second emptiness condition, having a second strictness, when the given packet is associated with a second application.

In another embodiment, the time-stamping circuit is configured to apply first and second emptiness conditions, having first and second different levels of strictness, to first and second different given packets of a same application. In yet another embodiment, the time-stamping circuit is configured apply a modified emptiness condition in response to detecting that the port is subject to backpressure from the network. In still another embodiment, the time-stamping circuit is configured to set the emptiness condition depending on a link speed of a network link connected to the port.

In an embodiment, the time-stamping circuit is configured to verify whether the pipeline stage meets the emptiness condition by receiving a status indication from the pipeline stage. In an example embodiment, the time-stamping circuit is configured to verify whether the pipeline stage meets the emptiness condition by waiting a time duration while the processing in the transmission pipeline is suspended.

In a disclosed embodiment, the time-stamping circuit is configured to report a level of emptiness of the pipeline stage to a processor of the network device. In an embodiment, the time-stamping circuit is configured to apply a failsafe mechanism that limits a maximal extent of suspension of processing in the transmission pipeline.

In some embodiments, the transmission pipeline and the time-stamping circuit are configured to process packets for a plurality of hosts. In an example embodiment, the time-stamping circuit is configured to apply a first setting of the emptiness condition to a first host among the hosts, and a second setting of the emptiness condition, different from the first setting, to a second host among the hosts. In another embodiment, the time-stamping circuit is configured to perform a first type of verification of the emptiness condition for a first host among the hosts, and a second type of verification of the emptiness condition, different from the first type, for a second host among the hosts.

In yet another embodiment, the given packet originates from a given host among the hosts, and the time-stamping circuit is configured to temporarily stall processing of the packets originating from the hosts other than the given host, so as to enable the pipeline stage to meet the emptiness condition for time-stamping the given packet. In still another embodiment, the time-stamping circuit is configured to prohibit suspension of at least some of the packets originating from a given host among the hosts.

In an embodiment, the time-stamping circuit is configured to insert a time-stamp into the given packet, and the pipeline stage having the variable processing delay is an encryption engine that is configured to encrypt the given packet including the inserted time-stamp.

There is additionally provided, in accordance with an embodiment of the present invention, a method in a network device. The method includes, using a transmission pipeline in the network device, the transmission pipeline including multiple processing stages, processing packets and sending the packets to a network. Using a time-stamping circuit in the network device, (i) at least some processing of at least a given packet in the transmission pipeline is temporarily suspended, a verification is made whether a pipeline stage having a variable processing delay, located downstream from the time-stamping circuit, meets an emptiness condition, and (iii) only when the pipeline stage meets the emptiness condition, the given packet is time-stamped and the processing of the given packet is resumed.

The present invention will be more fully understood from the following detailed description of the embodiments thereof, taken together with the drawings in which:

DETAILED DESCRIPTION OF EMBODIMENTS

Overview

Embodiments of the present invention that are described herein provide methods and apparatus for accurate time-stamping of outbound (egress) packets in network devices. The embodiments described herein refer mainly to implementation in a network adapter, but the disclosed techniques are also applicable to network switches and other kinds of network devices that require accurate time-stamping.

Typically, a network device comprises a transmission (TX) pipeline that processes packets and transmits them via an egress port to a network. In order to time-stamp the packets accurately with the egress time, it is desirable to time-stamp the packets at a point of the pipeline that is as close as possible to the egress port. In many practical implementations, however, one or more processing stages still remain downstream from the time-stamping point, i.e., between the time-stamping point and the egress port.

Such intermediate processing stages are less of a problem if their latency is fixed, because this latency can be calibrated and compensated for in the time-stamps. Intermediate processing stages having a variable latency, on the other hand, are problematic, since they add variable jitter to the time-stamps and degrade their accuracy. Aspects relating to estimation of time jitter in time-stamps are addressed, for example, in U.S. patent application Ser. No. 17/315,396, filed May 10, 2021, whose disclosure is incorporated herein by reference.

For example, any buffer or queue located between the time-stamping point and the egress port will add variable latency to the time-stamps, since the latency of the buffer or queue varies according to its occupancy level. The description that follows refers to "buffers" for the sake of clarity and brevity. In the context of the present disclosure and in the claims, however, the term "buffer" refers broadly to various types of memory, registers or data structures that temporarily store packets, portions of packets, or descriptors, pointers or metadata associated with packets. Various queues, for example, are also regarded herein as buffers. The usage of a buffer may have any suitable producer/consumer semantics (e.g., the entity writing into a buffer may be the same entity that reads from the buffer, or a different entity; a buffer may have multiple producers and/or multiple consumers; the order of writing items into a buffer may be the same as the order or readout from the buffer, or a different order; etc.).

Other types of processing stages in the pipeline may also have variable processing delays, and may therefore affect time-stamping accuracy. Examples of such processing stages include, but are not limited to, cryptographic engines such as IPsec engines and MACsec engines. The description that follows refers mainly to buffers, by way of example, but the disclosed techniques are applicable to various other kinds of processing stages. The terms "pipeline stage" and "processing stage" are used interchangeably herein.

In some embodiments of the present invention, the network device comprises a time-stamping circuit that time-stamps egress packets with high accuracy, even though the TX pipeline comprises a buffer located downstream from the time-stamping point. (The terms "downstream from the time-stamping point" and "downstream from the time-stamping circuit" are used interchangeably herein.)

In some embodiments, in order to time-stamp a given packet accurately, the time-stamping circuit ensures that, at the time of time-stamping, the buffer located downstream from the time-stamping point is sufficiently empty. In this manner, the time-stamping circuit essentially clears a low-jitter path in the pipeline for the given packet. The time-stamping circuit may verify various emptiness conditions with respect to the buffer, e.g., that the buffer is completely empty, that the occupancy level of the buffer is lower than a threshold, etc. The emptiness condition is typically such that, when met, the buffer's latency jitter is small enough to achieve the required time-stamping accuracy.

In some embodiments, the time-stamping circuit actively causes the buffer to drain and become empty, by temporarily suspending at least part of the processing in the pipeline (e.g., suspending processing upstream of the buffer, at least of the given packet and possibly of all packets). The time-stamping circuit then verifies whether the buffer meets the emptiness condition. Only when the buffer meets the emptiness condition, the time-stamping circuit time-stamps the given packet and resumes pipeline processing.

The time-stamping circuit may use various techniques, direct or indirect, for assessing whether the buffer meets the emptiness condition. In some embodiments the time-stamping circuit receives explicit fill-status indications from the buffer. In other embodiments, the time-stamping circuit waits a defined time duration while pipeline processing is suspended. A combination of the two techniques can also be used.

As can be appreciated, suspension of processing in the pipeline may cause some degradation in performance, such as in the average transmission latency and throughput. Therefore, in some embodiments the time-stamping circuit applies the disclosed technique selectively, i.e., only to selected packets. For example, high-accuracy time-stamping may be applied only to time-synchronization packets, e.g., PTP packets.

Another way to reduce the possible degradation in performance, which might be caused by the disclosed technique, is to adaptively modify the strictness of the emptiness condition to match specific needs. For example, some packet types or applications may require higher-accuracy time-stamping than others, and therefore warrant a more stringent emptiness condition. For other packet types or applications, a more relaxed emptiness condition may suffice. Since performance degradation typically grows with the strictness of the emptiness condition, such an adaptive approach can achieve a better trade-off between time-stamping accuracy and communication performance.

The methods and apparatus described herein achieve highly accurate time-stamping, e.g., on the order of several nanoseconds, even in the presence of buffers having large latency jitter, e.g., on the order of hundreds of nanoseconds or several microseconds.

Various implementation options and use-cases of the disclosed techniques are described herein. Aspects of multi-host configurations, in which the network device serves multiple hosts, are also addressed.

System Description

Figure 1:
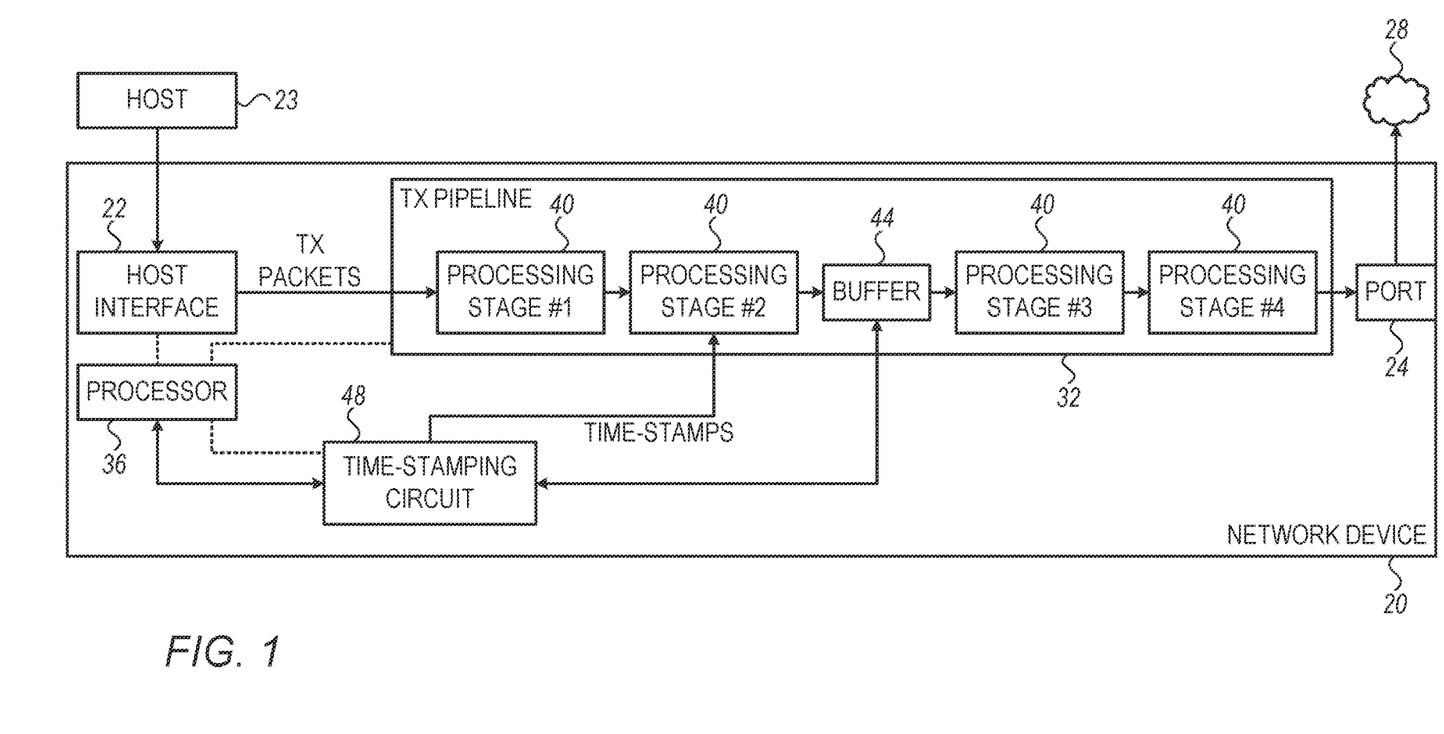
FIG. 1 is a block diagram that schematically illustrates a network device that time-stamps egress packets with high accuracy, in accordance with an embodiment of the present invention.

FIG. 1 is a block diagram that schematically illustrates a network device 20 that time-stamps egress packets with high accuracy, in accordance with an embodiment of the present invention. In the present example, network device 20 is a network adapter, e.g., an Ethernet NIC, an Infiniband™ Host Channel Adapter (HCA), a Data Processing Unit (DPU—also referred to as "Smart-NIC"), a network-enabled Graphics Processing Unit (GPU), a Field-Programmable Gate Array (FPGA), etc. Alternatively, network device 20 may comprise a network switch or router, or any other suitable type of device capable of network communication.

Network device 20 (a network adapter in the present example) comprises a host interface 22 for connecting to a host 23, at least one port 24 for connecting to a network 28, a transmission (TX) pipeline 32 for processing egress (outbound packets), a processor 36 for running software that manages network device 20, and a time-stamping circuit 48. Pipeline 32 comprises multiple processing stages 40, and a buffer 44. Other possible elements of network device 20, which are not related to the disclosed technique, e.g., a reception (RX) pipeline for receiving packets from the network, have been omitted from the figure for the sake of clarity.

TX pipeline 32 receives packets via host interface 22, for transmission to network 28. Pipeline 32 processes the packets using processing stages 40, in the present example four stages denoted STAGE #1-STAGE #4. Operations that can be applied by stages 40 may include, for example, encapsulating packets in VLAN tunnel headers, encrypting packets using IPSec, and calculating a packet's Ethernet Frame Check Sequence (FCS) and appending the FCS to the packet, to name only a few. Between STAGE #2 and STAGE #3, the packets are buffered in buffer 44. Following STAGE #4, the packets are transmitted via port 24 (also referred to as egress port) to network 28.

In some embodiments, time-stamping circuit 48 time-stamps at least some of the packets in pipeline 32 with the current time, e.g., the time-of-day, a network time used for synchronizing various elements of network 28 to a common time-base, or any other suitable time. The time-stamp applied to a given packet is intended to represent the egress time of the packet, i.e., the exact time at which the packet departed the network device. Time-stamping circuit 48 may obtain the current time from an integral clock, e.g., a PTP Hardware Clock (PHC), or from any other suitable source.

In the present example, time-stamping circuit 48 time-stamps the packets as they traverse STAGE #2 of pipeline 32. This stage of the pipeline is referred to as the "time-stamping point". Note that buffer 44 is located downstream from the time-stamping point, i.e., between the time-stamping point and egress port 24. As such, the occupancy level of buffer 44 affects the latency between the time-stamping point and egress port 24, which in turn affects the accuracy of the time-stamps. Techniques for mitigating this undesirable effect are described in detail below.

The configuration of network device 20 shown in FIG. 1 is an example configuration that is depicted purely for the sake of conceptual clarity. Any other suitable configuration can be used in alternative embodiments. For example, pipeline 32 may comprise any other suitable number of processing stages of any suitable types. Pipeline 32 may comprise more than one buffer 44, either upstream or downstream from the time-stamping point. Such buffers may be of any suitable types and sizes. The time-stamping point may be located at any other suitable stage of the pipeline. When the network device is a switch or router, as opposed to a network adapter, host interface 22 may not be present. Instead, the network device may receive the packets for transmission from another source, e.g., from an ingress port.

The various elements of network device 20 may be implemented using suitable hardware, such as in one or more Application-Specific Integrated Circuits (ASIC) or Field-Programmable Gate Arrays (FPGA), using software, or using a combination of hardware and software elements. In some embodiments, processor 36 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Accurate Time-Stamping Techniques

As explained above, since buffer 44 is located between the time-stamping point (stage #2) and egress port 24, the latency between the time-stamping point and the actual packet egress depends on the occupancy level of the buffer. In an example practical implementation, this latency may vary between 100 nS (for an empty buffer) and 2 µS (for a full buffer). In some applications, e.g., for time-stamping of PTP packets, a jitter of such magnitude is unacceptable.

In some embodiments, time-stamping circuit 48 overcomes the latency jitter of buffer 44 by ensuring that, for a given packet that needs to be time-stamped accurately, buffer 44 is sufficiently empty at the time the packet is time-stamped and sent downstream in pipeline 32.

In some embodiments, when preparing to time-stamp a given packet, time-stamping circuit 48 temporarily suspends at least some of the processing in pipeline 32 in order to drain buffer 44. Typically, processing is suspended in processing stages 40 upstream of buffer 44, and continues normally in processing stages 40 downstream of buffer 44. In an example implementation, time-stamping circuit 48 suspends the operation of the stage that immediately precedes it in the pipeline (stage #2 in the example of FIG. 1). Consequently, the outputs of preceding stages accumulate in the pipeline, e.g., in buffers between stages. In extreme cases, buffering space may be exhausted and the entire portion of the pipeline that is upstream from buffer 44 may be stalled. Such an event, however, is typically very rare. More generally, however, circuit 48 may use any suitable form of suspension that causes buffer 44 to drain.

In one embodiment, circuit 48 suspends processing of only the given packet that is about to be time-stamped. In other embodiments, processing of all pending packets is suspended. In yet other embodiments, processing of a selected subset of the packets is suspended. For example, some packet types may be defined as critical, in the sense that they should not be suspended. One non-limiting example is a "mission critical" packet in an autonomous vehicle network. In such cases, circuit 48 may only suspend processing of packets that are not defined as critical.

After suspending packet processing, time-stamping circuit 48 verifies whether the buffer meets a defined "emptiness condition" with respect to buffer 44. The emptiness condition is typically defined such that, when met, the latency jitter of buffer 44 is small enough to achieve the required time-stamping accuracy.

In various embodiments, time-stamping circuit 48 may verify various emptiness conditions. In one embodiment, the emptiness condition requires that buffer 44 is completely empty. Other possible emptiness conditions may require that the occupancy level of buffer 44 is lower than a certain threshold, that buffer 44 holds fewer than a threshold number of packets, that buffer 44 holds less than a threshold data size, etc. The thresholds of the various emptiness conditions may be fixed, e.g., predefined, or adaptive.

As noted above, in some embodiments the emptiness condition may be adaptive, e.g., by adapting thresholds or in any other suitable way. One example scenario of adapting the emptiness condition relates to the use of PAUSE frames in Ethernet (a mechanism that is also sometimes referred to as XON/XOFF). Typically, in response to receiving a PAUSE frame from a link partner, network device 20 is expected to delay its transmissions, temporarily increasing the delay that packets experience between the timestamping point and egress on the wire. In some embodiments, time-stamping circuit 48 may react to an increase in the delay by loosening the emptiness condition, in order to ensure that time-stamped packets will not be affected by the larger delay downstream.

Another example for adapting the emptiness condition relates to runtime tuning. In some embodiments, one or more of the pipeline stages downstream from the time-stamping point can measure the typical or maximum amount of time packets spend in the pipeline from the time-stamping point to their egress. In an embodiment, time-stamping circuit 48 may tune the emptiness condition, e.g., continuously at runtime, to ensure that the pipeline is blocked for the minimum amount of time necessary.

In yet other embodiments, time-stamping circuit 48 may apply different emptiness conditions, having different levels of strictness, to different packets that require different time-stamping accuracy levels. Embodiments of this sort are addressed further below with reference to FIG. 3.

In other embodiments, time-stamping circuit 48 may apply different emptiness conditions depending on the link speed of the network link connected to port 24. For example, time-stamping circuit 48 may use a certain emptiness condition on a 10 GbE link, a different emptiness condition on a 25 GbE link, and yet another emptiness condition on a 200 GbE link.

In various embodiments, time-stamping circuit 48 may use various techniques for assessing whether buffer 44 meets the emptiness condition. In some embodiments, time-stamping circuit 48 receives explicit fill-status indications from the buffer. In other embodiments, time-stamping circuit 48 waits a certain time duration while processing in the pipeline is suspended. This time duration may be fixed, e.g., predefined, or adaptive. A combination of the two techniques (explicit buffer-status indications plus a wait time) can also be used. All of these techniques are regarded herein as ways of adapting the emptiness condition.

When buffer 44 meets the emptiness condition, it can be safely assumed that the latency jitter between the time-stamping point and the egress port is small. Thus, upon verifying that buffer 44 meets the emptiness condition, time-stamping circuit 48 time-stamps the given packet and resumes normal processing of pipeline 32.

In some embodiments, in addition to verifying the emptiness condition, time-stamping circuit 48 reports the level of emptiness of buffer 44 to processor 36 and/or to host 23.

In some embodiments, time-stamping circuit 48 applies the disclosed technique selectively, i.e., only to selected packets. In other words, time-stamping circuit 48 may support two mode—A normal mode in which packets are time-stamped regardless of whether buffer 44 meets the emptiness condition, and a high-accuracy mode in which packets are time-stamped only when buffer 44 meets the emptiness condition. The time-stamping circuit may apply the high-accuracy mode only to selected packets, e.g., only to PTP packets or other time-synchronization packets.

In some embodiments, time-stamping circuit 48 may choose between the modes based on external indications (e.g., from trustworthy software running in processor 36) that identify which packets require high-accuracy time-stamping and which packets do not. For example, the time-stamping circuit may receive indications that distinguish between PTP packets and other packets. For example, processor 36 may provide an indication for a given packet by setting a suitable bit in metadata associated with the packet. Such metadata may traverse pipeline 32 with the packet. Alternatively, any other suitable form of indication, in metadata or otherwise, can be used. Further alternatively, the time-stamping circuit may autonomously identify packets requiring high-accuracy time-stamping.

Another factor that may influence the time-stamping accuracy is backpressure from network 28. In other words, even if buffer 44 meets the emptiness condition, packets may still be stalled or subjected to high latency if the network applies backpressure to network device 20 due to congestion. Thus, in some embodiments, time-stamping circuit 48 applies the high-accuracy mode only while port 44 is not subject to backpressure from the network. Another possible way to consider backpressure is to modify the emptiness condition if backpressure exists. For example, in the presence of backpressure from the network, circuit 48 may wait for an extended time period before time-stamping a high-accuracy packet. Extending the wait period increases the likelihood that buffer 44 will be sufficiently empty, notwithstanding the backpressure.

In some embodiments, when suspending packet processing in order to accurately time-stamp a given packet, time-stamping circuit 48 applies a failsafe mechanism that limits the extent of temporary suspension of processing in pipeline 32. Such a mechanism prevents the temporary suspension from causing excessive performance degradation. Circuit 48 may limit the extent of suspension in various ways and using various criteria. In an example embodiment, time-stamping circuit 48 is configured with a (fixed or adaptive) time-out, i.e., a maximal length of time during which packet-processing suspension is permitted. In another embodiment, circuit 48 is configured with a (fixed or adaptive) maximal data size whose processing is permitted to be suspended. The maximal data size can be expressed, for example, in terms of a number of packets or a number of bits, for example. Hybrid criteria that consider both time and data size can also be used. In some embodiments, the failsafe mechanism is configurable. Configuring the maximum time-out or data size to infinity is equivalent to deactivating the failsafe mechanism.

If the failsafe mechanism triggers while preparing to time-stamp a given packet (e.g., maximum time-out and/or maximum data size exceeded), time-stamping circuit 48 may take any suitable action. For example, circuit 48 may revert to normal-accuracy time-stamping, i.e., time-stamp the given packet regardless of whether the emptiness condition is met or not. As another example, circuit 48 may abandon transmission of the given packet, and issue an error message to processor 36 and/or to host 23.

Figure 2:
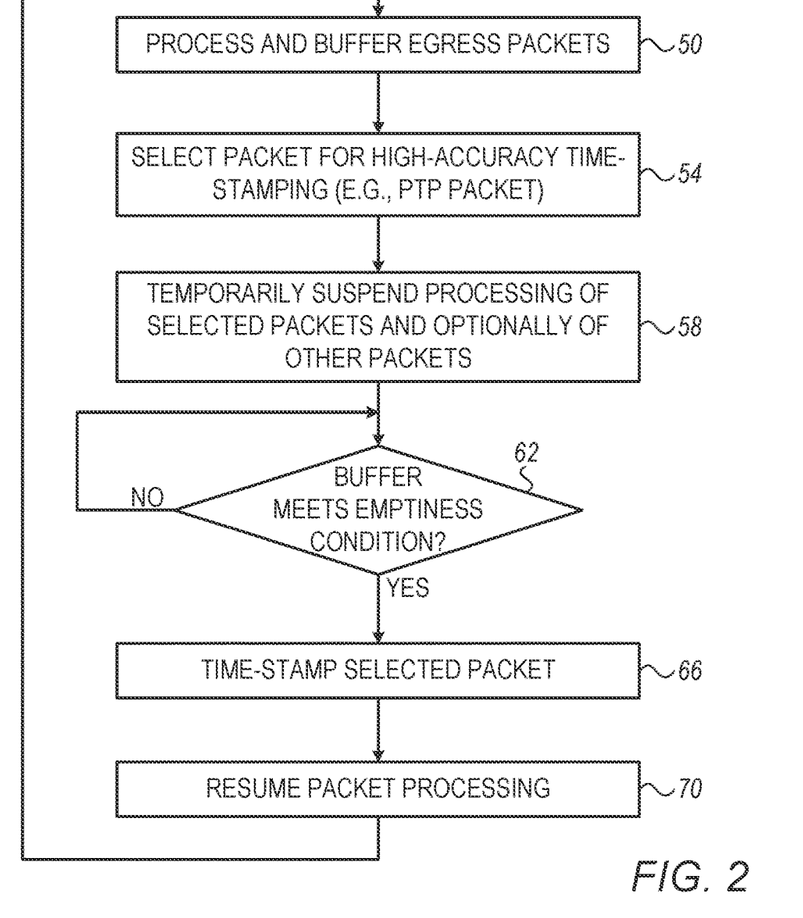
FIG. 2 is a flow chart that schematically illustrates a method for accurate time-stamping of egress packets, in accordance with an embodiment of the present invention.

FIG. 2 is a flow chart that schematically illustrates a method for accurate time-stamping of egress packets in network device 20, in accordance with an embodiment of the present invention. The method begins with TX pipeline 32 of network device 20 receiving and processing egress packets, at a TX processing step 50. As part of the packet processing in the pipeline, egress packets are buffered in buffer 44.

At a packet selection step 54, time-stamping circuit 48 selects a packet to be time-stamped with high accuracy. The selected packet may comprise, for example, a PTP packet. At a suspension step 58, time-stamping circuit 48 instructs pipeline 32 to suspend at least some of the processing performed upstream of buffer 44, for at least the selected packet. Any kind of pipeline operation, performed by any pipeline stage 40, can be suspended, e.g., encapsulation, encryption, FCS calculation, etc.

At an emptiness verification step 62, time-stamping circuit 48 verifies whether buffer 44 meets a certain emptiness condition. The emptiness condition may be predefined or may be changed dynamically. As soon as buffer 44 is found to meet the emptiness condition, time-stamping circuit 48 time-stamps the selected packet, at a time-stamping step 66. Time-stamping circuit 48 then resumes normal operation of pipeline 32, at a resumption step 70.

The flow of FIG. 2 is an example flow that is depicted purely for the sake of conceptual clarity. In alternative embodiment, any other suitable flow can be used for carrying out the disclosed technique.

Figure 3:
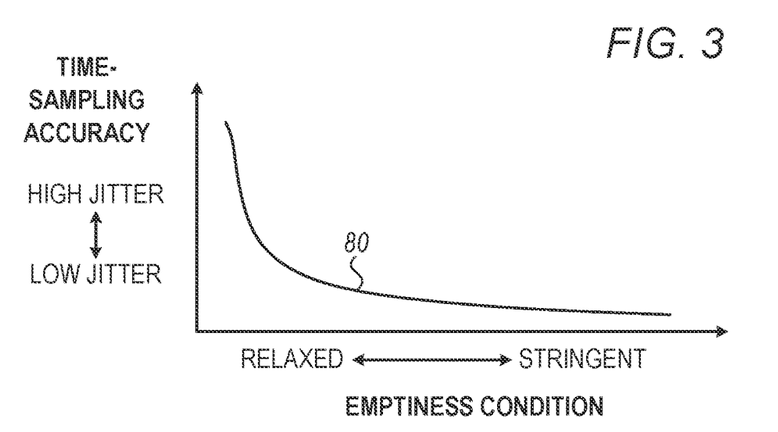
FIG. 3 is a graph showing an example relationship between time-stamping accuracy and emptiness-condition strictness, in accordance with an embodiment of the present invention.

FIG. 3 is a qualitative graph showing an example relationship between time-stamping accuracy and emptiness-condition strictness, in accordance with an embodiment of the present invention. The horizontal axis of FIG. 3 represents the strictness of the emptiness condition, with larger values corresponding to a more stringent condition (e.g., a requirement that the buffer be completely empty, or a longer wait period), and smaller values corresponding to a more relaxed condition. The vertical axis represents time-stamping accuracy, with larger values corresponding to poorer accuracy (and thus higher time jitter in the time-stamps), and smaller values corresponding to better accuracy (and thus lower time jitter).

A plot 80 shows a qualitative dependence of time-stamping accuracy on the strictness of the emptiness condition. As seen, relaxing the emptiness condition results in higher jitter, and vice versa. Typically, however, there is a bound on the achievable accuracy, even if the emptiness condition is made extremely strict. For example, once the emptiness condition is strict enough to drain the buffer with very high likelihood, further tightening the condition will provide little or no additional improvement in accuracy.

In various embodiments, network device 20 can use the above-described dependence for reducing performance degradation. In some embodiments, time-stamping circuit 48 may adapt the emptiness condition to match the time-stamping accuracy that is actually required for a certain packet or application. In this manner, the network device enforces strict emptiness conditions only when actually needed and not always, thereby minimizing performance degradation.

For example, in some embodiments, time-stamping circuit 48 may apply different emptiness conditions, which differ in strictness level, when time-stamping packets associated with different applications. Additionally or alternatively, time-stamping circuit 48 may apply different emptiness conditions, which differ in strictness level, when time-stamping different packets associated with a given application. In some embodiments the time-stamping circuit may receive indications (e.g., in metadata that travels with the packets) indicative of the required strictness level of the emptiness condition. In other embodiments the time-stamping circuit may decide autonomously on the required strictness, e.g., by autonomously identifying the application with which a given packet is associated.

In some embodiments, by adaptively modifying the emptiness condition, time-stamping circuit 48 adjusts the time-stamping accuracy until reaching a desired target accuracy.

Accurate Time-Stamping with Processing Stages Having Variable Delays

The description above referred mainly to buffers, which have variable occupancy levels and therefore variable delays. The disclosed techniques, however, are not limited to buffers, and can be used with various other processing stages having variable processing delays. Non-limiting examples of variable-delay processing stages are cryptographic engines. Typically, although not necessarily, processing stages that operate on packet data (as opposed to operating only on packet headers) are more likely to have large delay variations.

When a variable-delay processing stage is located in TX pipeline 32 downstream from the time-stamping point, time-stamping circuit 48 may apply the disclosed techniques similarly to the way they are applied to buffers.

In an example embodiment, when preparing to time-stamp a given packet accurately, time-stamping circuit 48 temporarily suspends at least some of the processing of at least some of the packets in the TX pipeline upstream from the variable-delay stage. Then, circuit 48 checks whether the variable-delay processing stage meets an emptiness condition. The emptiness condition is typically set so that the variable-delay processing stage completed processing of all preceding packets, and will therefore delay the given packet by a minimal, known delay.

Any of the above-described emptiness conditions, and any of the above-described techniques for verifying whether the emptiness condition is met, can be used.

In an example embodiment, each variable-delay processing stage in pipeline 32 is configured to output a "done" signal when it completes processing and becomes idle. one possible way for time-stamping circuit 48 to verify the emptiness condition is to wait until all "done" outputs of the downstream variable-delay stages are set. In other embodiments, circuit 48 may check only a subset of the "done" signals, or use the "done" signals in any other way, possibly in combination with other information.

Another advantage of the disclose technique is the ability to insert a time-stamp into a packet, and then encrypt the packet including the time-stamp, and still achieve high time-stamping accuracy. Since encryption stages tend to have large delay variations, this goal is impossible, or at least highly challenging, to achieve without the disclosed technique.

Multi-Host Use-Cases

In the embodiment of FIG. 1, network device 20 serves a single host 23. In alternative embodiments, however, network device 20 (a network adapter in this example) may serve multiple hosts 23 that may operate independently of one another. In particular, the network device may apply the disclosed time-stamping techniques to egress packets originating from multiple different hosts.

In some embodiments, time-stamping circuit 48 in network device 20 operates differently for different hosts. For example, time-stamping circuit 48 may evaluate different emptiness conditions for different hosts (e.g., each host may have its own emptiness condition), and/or verify the emptiness condition differently for different hosts. In an example embodiment, time-stamping circuit 48 may verify, for one host, that buffer 44 is empty and also wait a defined time duration. For a second host, time-stamping circuit 48 may verify that buffer 44 is 90% empty without waiting any additional duration. For a third host, time-stamping circuit 48 may disable high-accuracy time-stamping altogether. Alternatively, any other suitable modes of operation can be used.

In some embodiments, time-stamping circuit 48 may give priority to a selected host over the other hosts, in order to guarantee high-accuracy time-stamping for packets originating from that host. For example, time-stamping circuit 48 may temporarily stall transmission from all the hosts other than the selected host, and during the suspension time-stamp packets from the selected host. As another example, circuit 48 may prohibit suspension of (some or all) packets of a selected host due to accurate time-stamping for other hosts. Such selective operation may be transparent to the other hosts. This feature is useful, for example, when one of the hosts in a multi-host configuration serves as a PTP grandmaster, or otherwise plays some critical role in the network.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
a port for connecting to a network;
a transmission pipeline, which comprises multiple pipeline stages and is configured to process packets and to send the packets to the network via the port; and
a time-stamping circuit, configured to:
temporarily suspend at least some processing of at least a given packet in the transmission pipeline;
while the processing is suspended, estimate a current non-zero latency of a pipeline stage having a variable processing delay, located downstream from the time-stamping circuit; and
upon detecting that the current non-zero latency of the pipeline stage meets a timestamping accuracy requirement specified for the given packet, time-stamp the given packet and resume the processing of the given packet.

2. The network device according to claim 1, wherein the pipeline stage having the variable processing delay is a buffer having a variable occupancy level.

3. The network device according to claim 1, wherein the time-stamping circuit is configured to support (i) a normal mode in which packets are time-stamped regardless of whether the current non-zero latency of the pipeline stage meets the timestamping accuracy requirement, and (ii) a high-accuracy mode in which packets are time-stamped only when the current non-zero latency of the pipeline stage meets the timestamping accuracy requirement.

4. The network device according to claim 3, wherein the time-stamping circuit is configured to apply the high-accuracy mode only to selected packets.

5. The network device according to claim 3, wherein the time-stamping circuit is configured to apply the high-accuracy mode only to time-synchronization packets.

6. The network device according to claim 3, wherein the time-stamping circuit is configured to apply the high-accuracy mode only while the port is not subject to backpressure from the network.

7. The network device according to claim 1, wherein the time-stamping circuit is configured to verify whether the current non-zero latency of the pipeline stage meets a timestamping accuracy requirement specified for the given packet, by receiving a status indication from the pipeline stage.

8. The network device according to claim 1, wherein the time-stamping circuit is configured to verify that the current non-zero latency of the pipeline stage meets a timestamping accuracy requirement specified for the given packet, by waiting a time duration while the processing in the transmission pipeline is suspended.

9. The network device according to claim 1, wherein the time-stamping circuit is configured to report a level of emptiness of the pipeline stage to a processor of the network device.

10. The network device according to claim 1, wherein the time-stamping circuit is configured to apply a failsafe mechanism that limits a maximal extent of suspension of processing in the transmission pipeline.

11. The network device according to claim 1, wherein the transmission pipeline and the time-stamping circuit are configured to process packets for a plurality of hosts.

12. The network device according to claim 11, wherein the time-stamping circuit is configured to prohibit suspension of at least some of the packets originating from a given host among the hosts.

13. The network device according to claim 1, wherein the time-stamping circuit is configured to verify whether the current non-zero latency of the pipeline stage meets the timestamping accuracy requirement specified for the given packet, by evaluating an emptiness condition that, when met, indicates that the current non-zero latency meets the timestamping accuracy requirement.

14. The network device according to claim 13, wherein the time-stamping circuit is configured to adaptively modify a strictness of the emptiness condition.

15. The network device according to claim 13, wherein the time-stamping circuit is configured to adjust a time-stamping accuracy of the time-stamping circuit until reaching a target accuracy, by adaptively modifying the emptiness condition.

16. The network device according to claim 13, wherein the time-stamping circuit is configured to apply a first emptiness condition, having a first strictness, when the given packet is associated with a first application, and to apply a second emptiness condition, having a second strictness, when the given packet is associated with a second application.

17. The network device according to claim 13, wherein the time-stamping circuit is configured to apply first and second emptiness conditions, having first and second different levels of strictness, to first and second different given packets of a same application.

18. The network device according to claim 13, wherein the time-stamping circuit is configured apply a modified emptiness condition in response to detecting that the port is subject to backpressure from the network.

19. The network device according to claim 13, wherein the time-stamping circuit is configured to set the emptiness condition depending on a link speed of a network link connected to the port.

20. The network device according to claim 13, wherein the transmission pipeline and the time-stamping circuit are configured to process packets for a plurality of hosts, and wherein the time-stamping circuit is configured to apply a first setting of the emptiness condition to a first host among the hosts, and a second setting of the emptiness condition, different from the first setting, to a second host among the hosts.

21. The network device according to claim 13, wherein the transmission pipeline and the time-stamping circuit are configured to process packets for a plurality of hosts, and wherein the time-stamping circuit is configured to perform a first type of verification of the emptiness condition for a first host among the hosts, and a second type of verification of the emptiness condition, different from the first type, for a second host among the hosts.

22. The network device according to claim 13, wherein the transmission pipeline and the time-stamping circuit are configured to process packets for a plurality of hosts, wherein the given packet originates from a given host among the hosts, and wherein the time-stamping circuit is configured to temporarily stall processing of the packets originating from the hosts other than the given host, so as to enable the pipeline stage to meet the emptiness condition for time-stamping the given packet.

23. The network device according to claim 1, wherein the time-stamping circuit is configured to insert a time-stamp into the given packet, and wherein the pipeline stage having the variable processing delay is an encryption engine that is configured to encrypt the given packet including the inserted time-stamp.

24. A method in a network device, the method comprising:
using a transmission pipeline in the network device, the transmission pipeline comprising multiple processing stages, processing packets and sending the packets to a network; and
using a time-stamping circuit in the network device:
temporarily suspending at least some processing of at least a given packet in the transmission pipeline;
while the processing is suspended, estimating a current non-zero latency of a pipeline stage having a variable processing delay, located downstream from the time-stamping circuit; and
upon detecting that the current non-zero latency of the pipeline stage meets a timestamping accuracy requirement specified for the given packet, time-stamping the given packet and resuming the processing of the given packet.

25. The method according to claim 24, wherein the pipeline stage having the variable processing delay is a buffer having a variable occupancy level.

26. The method according to claim 24, and comprising operating the time-stamping circuit in (i) a normal mode in which packets are time-stamped regardless of whether the current non-zero latency of the pipeline stage meets the timestamping accuracy requirement, and (ii) a high-accuracy mode in which packets are time-stamped only when the current non-zero latency of the pipeline stage meets the timestamping accuracy requirement.

27. The method according to claim 24, wherein verifying whether the current non-zero latency of the pipeline stage meets the timestamping accuracy requirement specified for the given packet comprises evaluating an emptiness condition that, when met, indicates that the current non-zero latency meets the timestamping accuracy requirement.

28. The method according to claim 27, and comprising adaptively modifying a strictness of the emptiness condition.

29. The method according to claim 27, and comprising adjusting a time-stamping accuracy of the time-stamping circuit until reaching a target accuracy, by adaptively modifying the emptiness condition.

30. The method according to claim 24, wherein verifying whether the current non-zero latency of the pipeline stage meets the timestamping accuracy requirement comprises waiting a time duration while the processing in the transmission pipeline is suspended.

* * * * *